(12) United States Patent
Plunkett (10) Patent No.: US 12,466,049 B2
(45) Date of Patent: Nov. 11, 2025

(54) POWER TOOL WITH TETHER

(71) Applicant: MILWAUKEE ELECTRIC TOOL CORPORATION, Brookfield, WI (US)

(72) Inventor: Sarah K. Plunkett, New Berlin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 2 days.

(21) Appl. No.: 18/510,425

(22) Filed: Nov. 15, 2023

(65) Prior Publication Data
US 2024/0157537 A1 May 16, 2024

Related U.S. Application Data

(60) Provisional application No. 63/383,811, filed on Nov. 15, 2022.

(51) Int. Cl.
| | | |
|---|---|---|
| B25F 5/00 | (2006.01) | |
| B25F 5/02 | (2006.01) | |
| B25H 3/00 | (2006.01) | |
| H01M 50/247 | (2021.01) | |

(52) U.S. Cl.
CPC ............... B25F 5/02 (2013.01); B25H 3/006 (2013.01); H01M 50/247 (2021.01); *H01M 2220/30* (2013.01)

(58) Field of Classification Search
CPC ........ B25F 5/02; B25H 3/006; H01M 50/247; H01M 2220/30
See application file for complete search history.

(56) References Cited

U.S. PATENT DOCUMENTS

| | | |
|---|---|---|
| 2,496,612 A | 2/1950 | Wilhide |
| 4,841,929 A | 6/1989 | Tuggle et al. |
| 6,487,756 B1 | 12/2002 | Vidal, Jr. |
| 7,108,079 B2 | 9/2006 | Sakai et al. |
| 7,124,470 B2 | 10/2006 | Alanis |
| 7,665,541 B2 | 2/2010 | Sakai et al. |
| 7,681,661 B2 | 3/2010 | Sakai et al. |
| 10,040,178 B2 | 8/2018 | Kondo et al. |
| 10,045,606 B2 | 8/2018 | Cirincione, II et al. |
| 10,136,722 B1 | 11/2018 | Cirincione, II et al. |
| 10,449,662 B2 | 10/2019 | Moreau et al. |
| D873,119 S | 1/2020 | Moreau et al. |
| 11,173,593 B2 | 11/2021 | Moreau et al. |
| 2003/0070822 A1 | 4/2003 | Kanzaki et al. |
| 2011/0042533 A1 | 2/2011 | Austin |
| 2018/0132600 A1* | 5/2018 | Moreau ............... B25F 5/02 |

(Continued)

FOREIGN PATENT DOCUMENTS

| | | |
|---|---|---|
| CN | 107443320 A | 12/2017 |
| DE | 10042178 C1 | 12/2001 |

(Continued)

*Primary Examiner* — Eyamindae C Jallow
(74) *Attorney, Agent, or Firm* — Michael Best & Friedrich LLP (57) ABSTRACT

A power tool includes a housing with a first portion and a second portion, a battery removably coupled to the housing, and a bracket coupled to the housing. The first and second portions define a longitudinal plane therebetween. The first portion is coupled to the second portion along the longitudinal plane by a fastener. The fastener extends through the bracket.

20 Claims, 6 Drawing Sheets

(56) References Cited

U.S. PATENT DOCUMENTS

| | | | |
|---|---|---|---|
| 2020/0047323 A1* | 2/2020 | Moreau | A45C 13/30 |
| 2020/0077775 A1 | 3/2020 | Moreau et al. | |
| 2020/0194747 A1* | 6/2020 | Rudolph | B25F 5/02 |
| 2020/0203514 A1* | 6/2020 | Yilmaz | H01L 29/7397 |
| 2020/0223053 A1 | 7/2020 | Nick et al. | |
| 2020/0227695 A1 | 7/2020 | Jones et al. | |
| 2020/0316766 A1 | 10/2020 | Machida | |
| 2021/0023690 A1 | 1/2021 | LaChica Koch et al. | |
| 2021/0053175 A1* | 2/2021 | Otani | B24B 23/02 |
| 2021/0107130 A1 | 4/2021 | Yoshikane et al. | |
| 2021/0205977 A1 | 7/2021 | Machida et al. | |
| 2021/0367305 A1* | 11/2021 | Wrobel | H01M 50/247 |

FOREIGN PATENT DOCUMENTS

| | | | | |
|---|---|---|---|---|
| DE | 102004032789 A1 | 2/2006 | | |
| EP | 3517254 A1 | 7/2019 | | |
| JP | 2019147220 A * | 9/2019 | | B23D 45/16 |
| WO | WO-2019194036 A1 * | 10/2019 | | B24B 23/02 |

\* cited by examiner

POWER TOOL WITH TETHER

CROSS-REFERENCE TO RELATED APPLICATIONS

This application claims priority to U.S. Provisional Patent Application No. 63/383,811, filed Nov. 15, 2022, the entire content of which is incorporated herein by reference.

BACKGROUND

The present disclosure relates to power tools, and, more particularly, to power tools with tethers for arresting the fall of the power tool if dropped.

SUMMARY

In some aspects, the techniques described herein relate to a power tool including: a housing including a first portion and a second portion, the first and second portions defining a longitudinal plane therebetween, the first portion coupled to the second portion along the longitudinal plane by a fastener; a battery removably coupled to the housing; and a bracket coupled to the housing such that the fastener extends through the bracket.

In some aspects, the techniques described herein relate to a power tool including: a housing including a motor housing portion and a handle portion extending from the motor housing portion, the handle portion including a recess; a motor supported within the motor housing portion; a battery coupled to the handle portion; and a bracket coupled to the handle portion and configured to be coupled to a tether, wherein the bracket is pivotable between a first position in which the bracket is disposed entirely within the recess and a second position in which the bracket protrudes out of the recess.

In some aspects, the techniques described herein relate to a power tool including: a housing including a motor housing portion and a handle portion extending from the motor housing portion, the handle portion including a battery receiving portion having an open end; a motor supported within the motor housing portion; a trigger located on a first side of the handle portion, wherein the trigger is configured to be actuated to energize the motor; a battery received by the battery receiving portion through the open end; a bracket coupled to the handle portion on a second side of the handle portion opposite the first side; and a tether coupled to the bracket, wherein the bracket is positioned such that the open end of the battery receiving portion faces upward if the tether arrests a fall of the power tool to inhibit the battery from falling out of the battery receiving portion.

Other features and aspects of the disclosure will become apparent by consideration of the following detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

Figure 1:
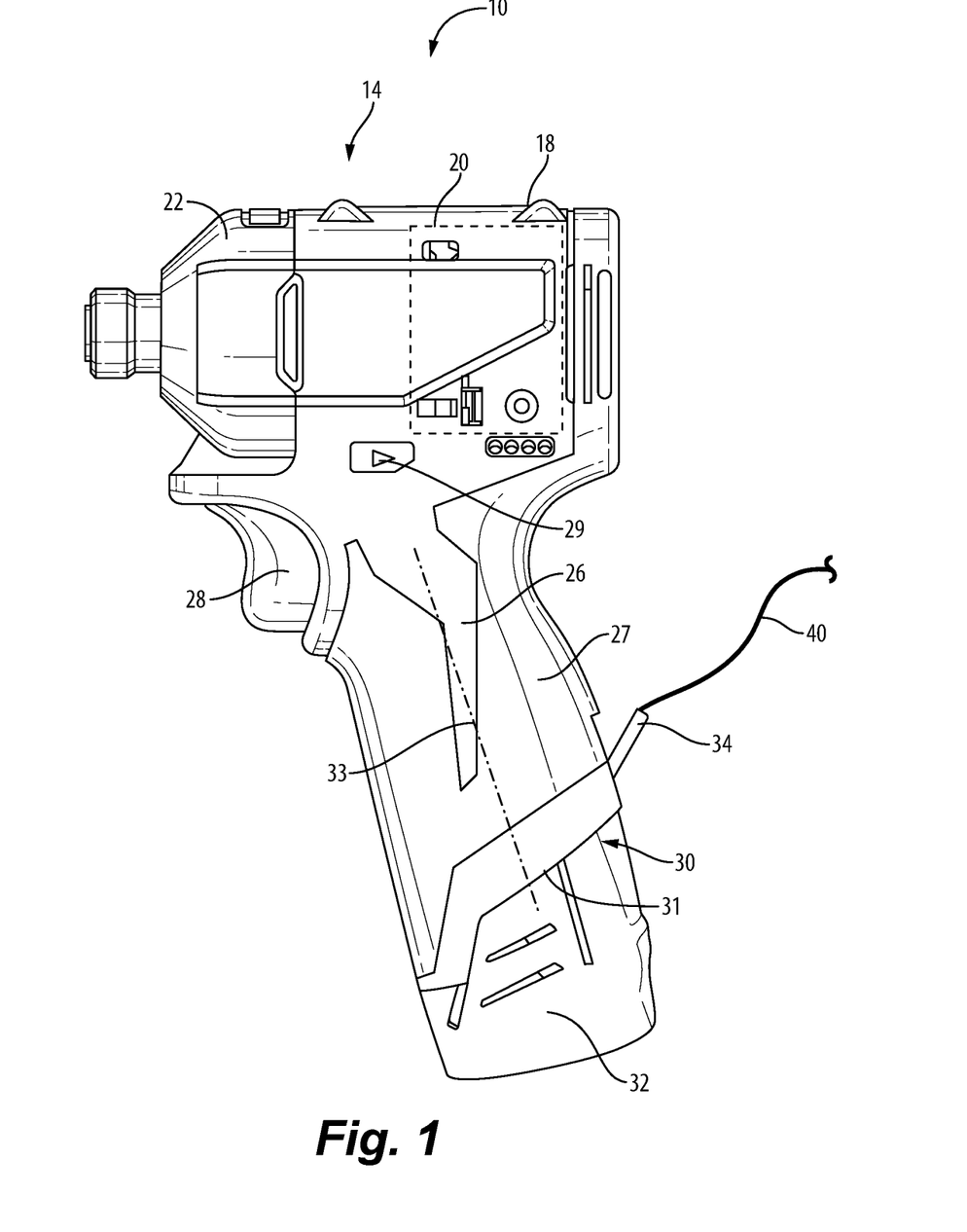
FIG. 1 is a side view of a power tool according to an embodiment of the present disclosure.

FIG. 1 illustrates a power tool 10, which in the illustrated embodiment is a rotary power tool in the form of an impact driver. The power tool 10 includes a housing 14 with a motor housing portion 18 enclosing an electric motor 20, a front housing portion or gear case 22 coupled to the motor housing portion 18 (e.g., by a plurality of fasteners), and a handle portion 26 extending from the motor housing portion 18. In some embodiments, the gear case 22 may be omitted. The handle portion 26 includes a grip 27 that can be grasped by a user operating the power tool 10. The grip 27 may include a rubber overmold.

With continued reference to FIG. 1, the power tool 10 includes a trigger 28 located on the handle portion 26. The trigger 28 can be actuated by a user of the power tool 10 (e.g., via the user's index finger while grasping the grip 27) to energize and de-energize the motor 20. In some embodiments, the trigger 28 may be a variable speed trigger configured to control an operating speed of the motor 20. The illustrated power tool 10 also includes a switch 29 located on the motor housing portion 18 and proximate an upper end of the handle portion 26. The switch 29 may be a direction control switch, operable to change a direction of rotation of the motor 20 (i.e., forward/reverse). The switch 29 may additionally or alternatively function as a safety switch to prevent actuation of the trigger 28 and/or operation of the motor 20.

The power tool 10 has a battery receiving portion 30 located at a bottom end 31 of the handle portion 26. The battery receiving portion 30 is configured to receive a battery 32 (e.g., a rechargeable power tool battery pack, which in some embodiments may have a nominal output voltage of 12 Volts). In the illustrated embodiment, the battery receiving portion 30 includes a cavity extending into the handle portion 26. The battery 32 is insertable into and removable from the battery receiving portion 30 along a battery insertion and removal axis 33. The battery insertion and removal axis 33 generally extends centrally through the handle portion 26 in a length direction of the handle portion 26.

Figure 2:
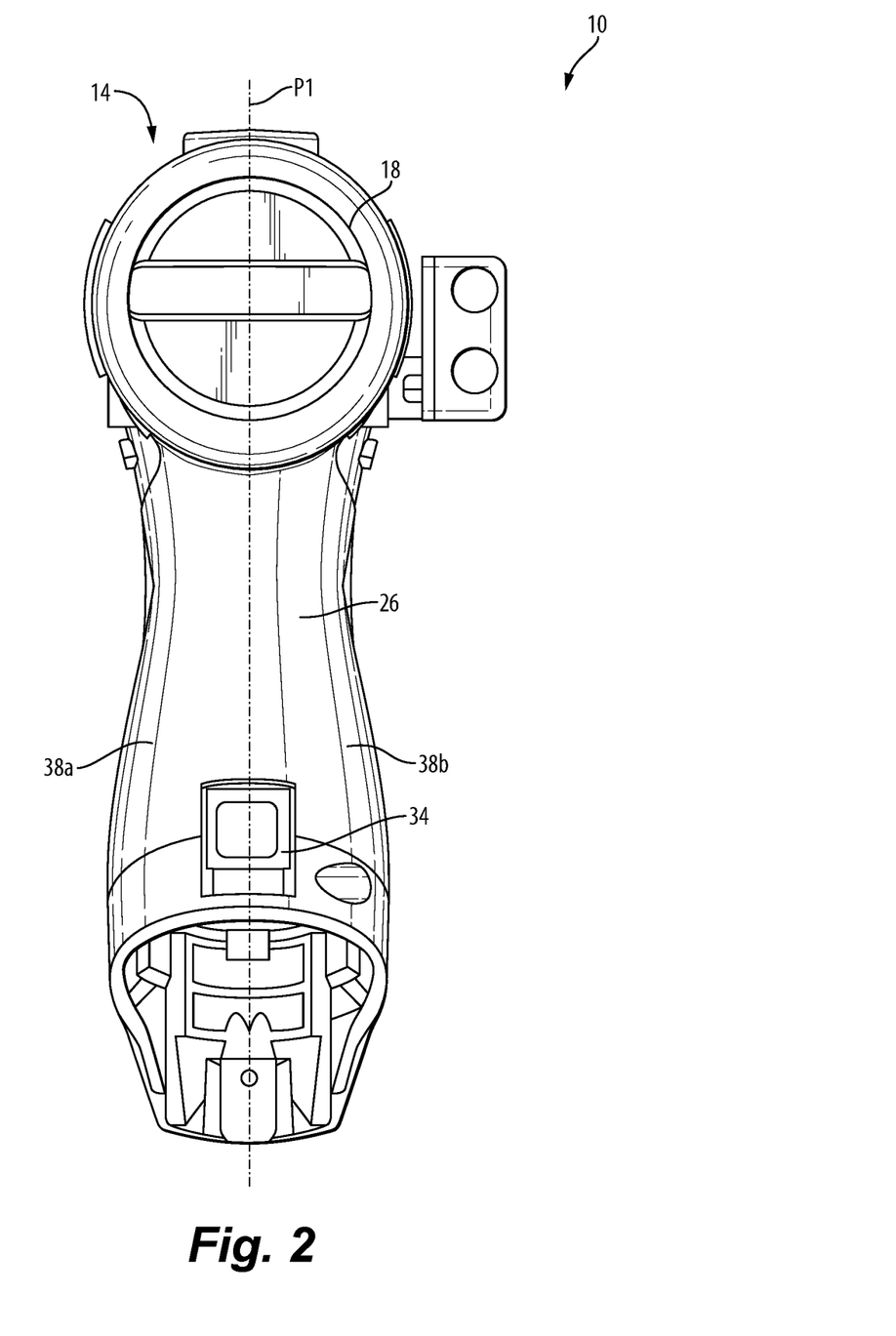
FIG. 2 is a rear view of the power tool of FIG. 1.
Figure 3:
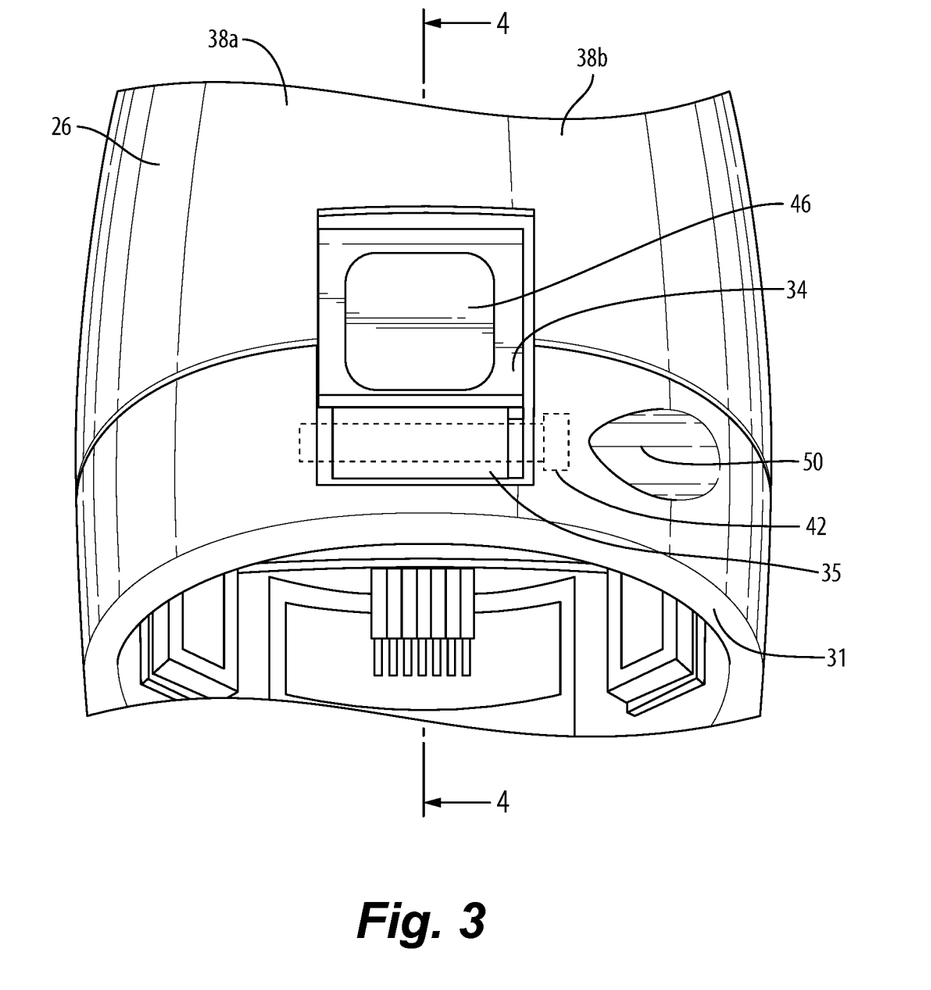
FIG. 3 is an enlarged rear view of a portion of the power tool of FIG. 1, illustrating a tether bracket of the power tool.

Referring to FIG. 2, the handle portion 26 and the motor housing portion 18 are defined by cooperating first and second clamshell halves 38a, 38b, which may be formed from a molded, high-strength plastic material in some embodiments. The first clamshell half 38a is coupled to the second clamshell half 38b by a plurality of fasteners 42 (FIG. 3). A longitudinal plane P1 is defined between (i.e., at the intersection of) the clamshell halves 38a, 38b.

With continued reference to FIG. 2, the power tool 10 further includes a bracket 34 disposed on a rear side of the handle portion 26. Stated another way, the bracket 34 is disposed on a side of the handle portion 26 opposite the trigger 28 (FIG. 1). The longitudinal plane P1 may intersect the bracket 34. In the illustrated embodiment, the longitudinal plane P1 intersects a center of the bracket 34 such that the bracket 34 is symmetrical about the longitudinal plane P1. As described in greater detail below, a tether 40 (FIG. 1) may be coupled to the bracket 34. An opposite end of the tether 40 may then be attached to a user, a structure, or the like, to arrest the fall of the power tool 10 if the power tool 10 is dropped.

Figure 5:
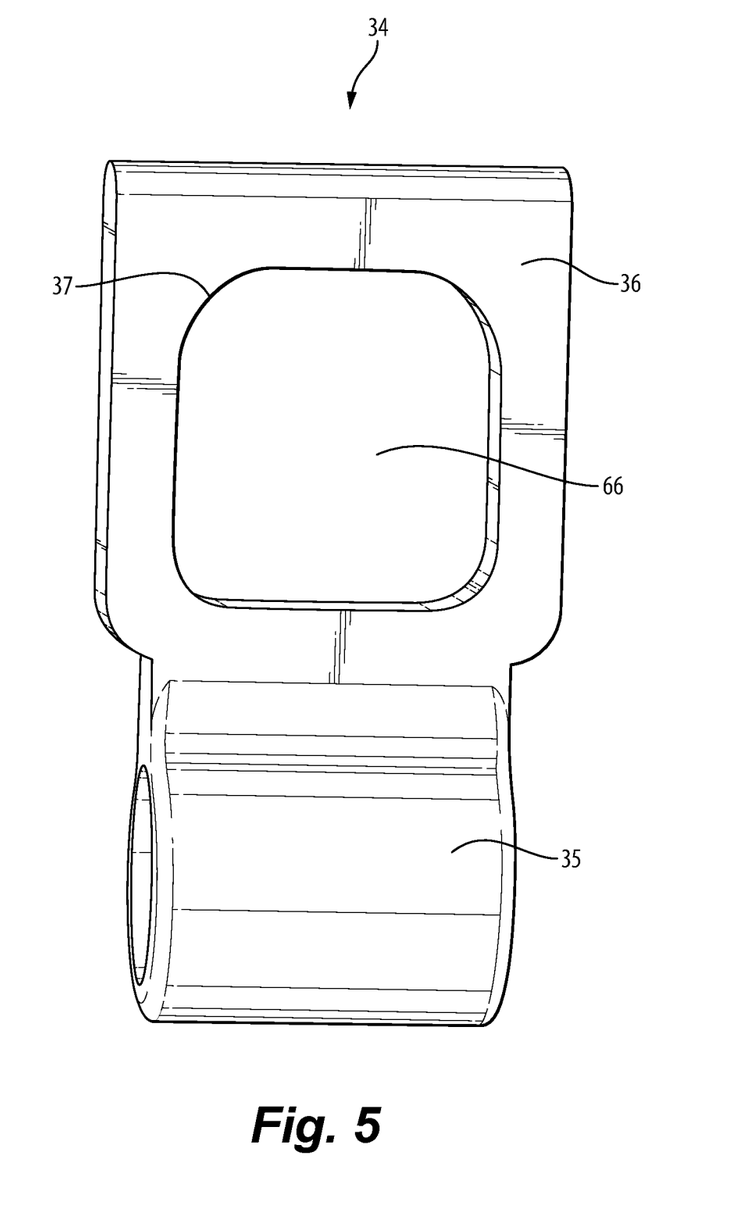
FIG. 5 is a perspective view of a tether bracket according to an embodiment of the disclosure.

The bracket 34 is illustrated in greater detail in FIG. 5. The illustrated bracket 34 includes a tubular portion 35 and a receiving portion 36. The receiving portion 36 is generally rectangular and includes rounded edges 37 defining an aperture 66. The tether 40 (FIG. 1) extends through the aperture 66 to couple the tether 40 to the bracket 34. The rounded edges 37 may reduce wear on the tether 40.

Figure 4:
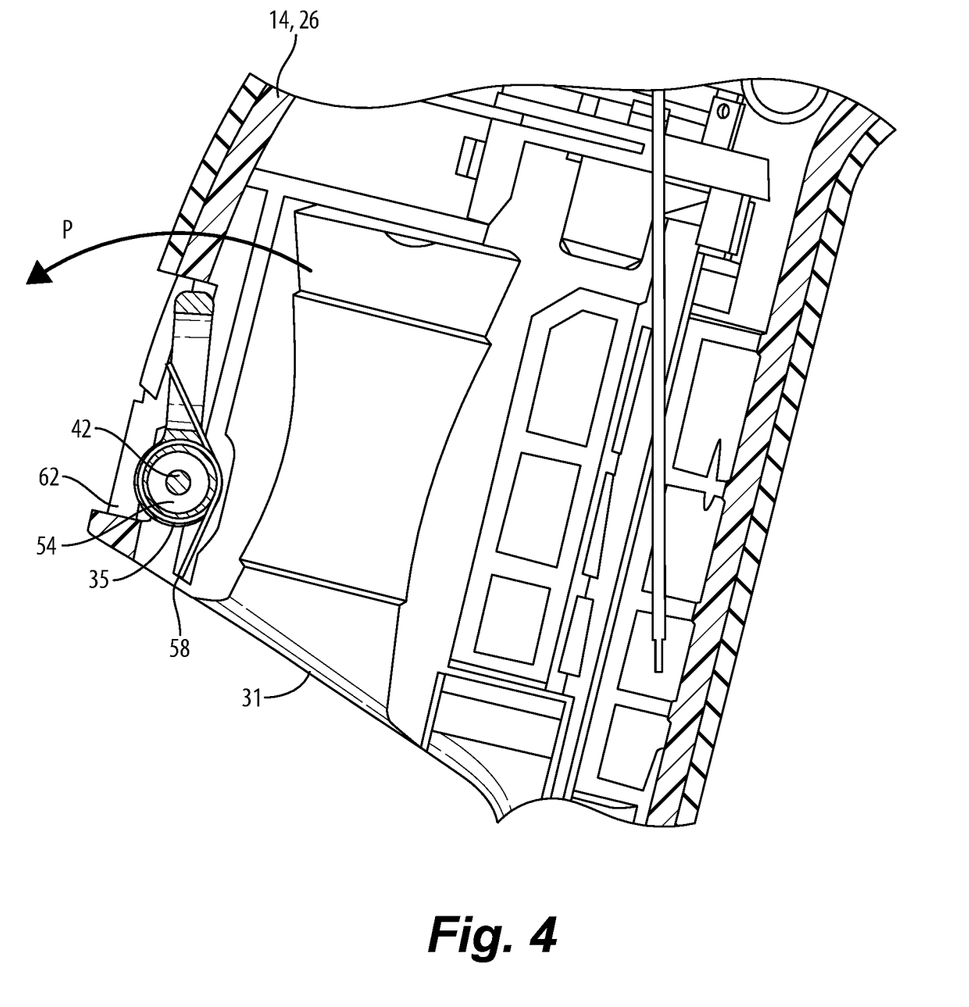
FIG. 4 is an enlarged cross-sectional view of a portion of the power tool of FIG. 1, taken along line 4-4 in FIG. 3.

Referring to FIGS. 3-4, the bracket 34 is disposed within a recess 46 in the handle portion 26 of the housing 14. The recess 46 is larger than the bracket 34 to allow the entire bracket 34 to fit within the recess 46. The housing 14 further includes a channel 50 (FIG. 3) and a boss 54 (FIG. 4) located adjacent the bottom end 31 of the handle portion 26 and configured to receive one of the plurality of fasteners 42. In particular, the channel 50 provides access for the fastener 42 to be installed (e.g., threaded) into the boss 54 to couple the clamshell halves 38a, 38b together.

With reference to FIG. 4, the tubular portion 35 of the bracket 34 is slid over the boss 54 when assembling the clamshell halves 38a, 38b to secure the bracket 34 to the housing 14. As such, the boss 54 and the fastener 42 extend through the tubular portion 35 of the bracket 34. This provides a strong anchor point for the bracket 34 to withstand high forces that may be exerted on the bracket 34 when arresting the fall of the power tool 10.

In the illustrated embodiment, the bracket 34 is pivotable about the boss 54 between a first position and a second position. FIG. 4 illustrates the bracket in the first position, in which the bracket 34 is disposed entirely within the recess 46, such that no part of the bracket 34 protrudes from the handle portion 26. The bracket 34 is biased into the first position by a biasing member 58 (e.g., a torsion spring), which surrounds the boss 54 in the illustrated embodiment. The bracket 34 may be pivoted against the bias of the biasing member 58 in the direction of arrow P into the second position, in which the bracket 34 protrudes out of the handle portion 26 (Orientation E in FIG. 6). In the second position, the bracket 34 may contact a stop surface 62 of the housing 14, to limit pivotal movement of the bracket 34 to the second position. In some embodiments, the bracket 34 may pivot an angle greater than 90 degrees from the first position to the second position. In some embodiments, the angle may be less than or equal to 90 degrees. In some embodiments, the bracket 34 may not be biased into the first position by a biasing member. Rather, friction can be generated between the tubular portion 35 and the boss 54. The friction can retain the bracket 34 in a desired position. For example, the friction between the tubular portion 35 and the boss 54 can retain the bracket 34 in the first and second positions.

Figure 6:
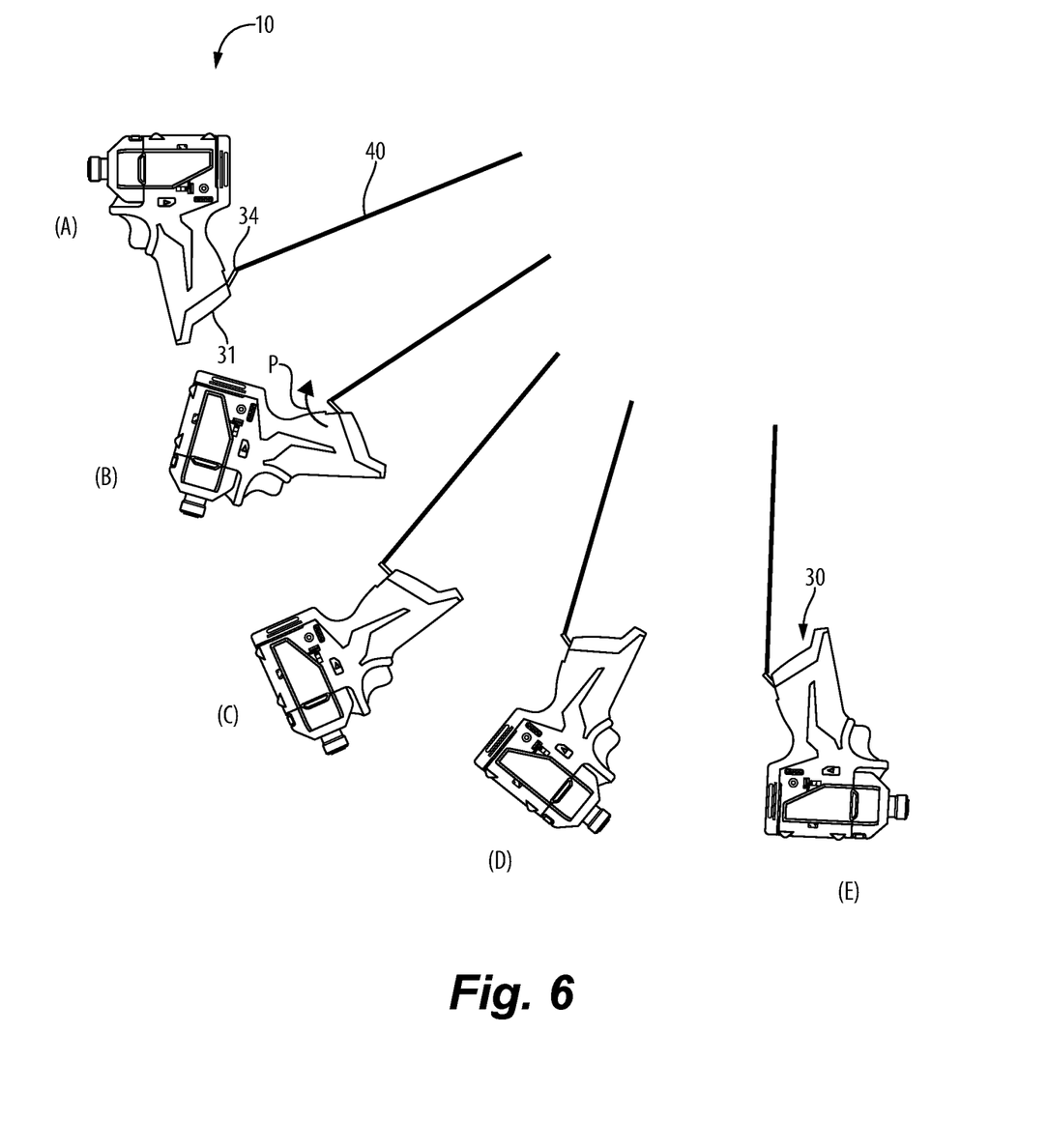
FIG. 6 is a schematic illustrating a falling motion of the power tool of FIG. 1 with a tether coupled to the tether bracket.

FIG. 6 illustrates an exemplary trajectory of the power tool 10 if the power tool 10 is dropped while the tether 40 is attached to both the bracket 34 and the user (or other anchor point). Orientation A of FIG. 6 illustrates the power tool 10 oriented in an upright position or typical use position, in which the power tool 10 is grasped by the user. In the upright position, the tether 40 extends away from the power tool 10 in a direction transverse to the battery removal and insertion axis 33 (FIG. 1). Orientations B-E illustrate the sequential trajectory of the power tool 10 in a falling motion after being dropped by the user from Orientation A. During the falling motion, the power tool 10 will invert due to the location of the bracket 34 relative to a center of gravity of the power tool 10. In particular, the bracket 34 is located closer to the bottom end 31 than the center of gravity. Because the bracket 34 is disposed between the center of gravity and the bottom edge 31, the power tool 10 will rotate until the center of gravity is located below the bracket 34, which functions as a pivot point. The inversion of the power tool 10 results in the open end of the battery receiving portion 30 facing upward when the tether 40 arrests the fall of the power tool 10. In this orientation, the battery 32 is protected from the sudden deceleration of the power tool 10 and will not fall out of the battery receiving portion 30. Accordingly, Orientation E illustrates the power tool 10 after being dropped by the user. In Orientation E, the power tool 10 is supported by the tether 40. The tether 40 extends away from the power tool 10 in a direction that generally aligns with the battery removal and insertion axis 33 (FIG. 1). Said another way, the tether 40 extends away from the bracket 34 in a direction away from the motor housing portion 18. In Orientation E, the illustrated bracket 34 extends past the battery receiving portion 30. More specifically, the illustrated bracket 34 extends through a plane (not shown) defined by the battery receiving portion 30.

With continued reference to FIG. 6, the force on the power tool 10 from falling may be resisted and at least partially absorbed by the biasing member 58. During the falling motion, the bracket 34 may pivot in the direction of arrow P from a starting position toward the second position, against the force of the biasing member 58.

Although the disclosure has been described in detail with reference to certain preferred embodiments, variations and modifications exist within the scope and spirit of one or more independent aspects of the disclosure as described.

Various features of the disclosure are set forth in the following claims.

What is claimed is:

1. A power tool comprising:
   a housing including a first portion and a second portion, the first and second portions defining a longitudinal plane therebetween, the first portion coupled to the second portion along the longitudinal plane by a fastener;
   a battery removably coupled to the housing; and
   a bracket coupled to the housing such that the fastener extends through the bracket.

2. The power tool of claim 1, wherein the housing includes a motor housing portion and a handle portion extending from the motor housing portion, and wherein the bracket is located on the handle portion.

3. The power tool of claim 2, further comprising a motor supported within the motor housing portion and a trigger located on a first side of the handle portion, wherein the bracket is located on a second side of the handle portion opposite the first side.

4. The power tool of claim 1, wherein the bracket is received in a recess in the housing.

5. The power tool of claim 4, wherein the bracket is pivotable between a first position in which the bracket is disposed within the recess and a second position in which the bracket protrudes out of the recess.

6. The power tool of claim 1, wherein the bracket is symmetrical about the longitudinal plane.

7. The power tool of claim 1, wherein the housing includes a boss, wherein the fastener is threaded into the boss, wherein the bracket includes a tubular portion that surrounds the boss, and wherein the bracket is pivotable about the boss.

8. The power tool of claim 7, wherein the bracket is pivotable about the boss between a first position and a second position, and wherein friction between the bracket and the boss is configured to retain the boss in the first and second positions.

9. The power tool of claim 7, wherein the bracket is pivotable about the boss between a first position and a second position, wherein the bracket is biased toward the first position by a biasing member, and wherein the biasing member surrounds the boss.

10. The power tool of claim 1, further comprising a tether coupled to the bracket.

11. A power tool comprising:
a housing including a motor housing portion and a handle portion extending from the motor housing portion, the handle portion including a recess formed on an outer surface of the handle portion;
a motor supported within the motor housing portion;
a battery coupled to the handle portion; and
a bracket coupled to the handle portion and configured to be coupled to a tether,
wherein the bracket is pivotable between a first position in which the bracket is disposed entirely within the recess and a second position in which the bracket protrudes out of the recess.

12. The power tool of claim 11, further comprising a biasing member to bias the bracket toward the first position.

13. The power tool of claim 11, wherein the bracket is pivotable from the first position to the second position through an angle greater than 90 degrees.

14. The power tool of claim 11, wherein the bracket includes a tubular portion and a receiving portion, and wherein the bracket is pivotable about the tubular portion.

15. The power tool of claim 14, wherein the receiving portion defines an aperture, and wherein the tether is configured to extend through the aperture to couple the tether to the bracket.

16. The power tool of claim 15, wherein the aperture includes rounded edges.

17. The power tool of claim 11, wherein the battery is coupled to a bottom end of the handle portion, and wherein the bracket is coupled to the handle portion adjacent the bottom end.

18. The power tool of claim 17, wherein the bracket extends past the bottom end in the second position.

19. The power tool of claim 11, wherein the power tool is configured to be supported by the tether, and wherein in response to the tether supporting the power tool, the bracket is in the second position.

20. A power tool comprising:
a housing including a motor housing portion and a handle portion extending from the motor housing portion, the handle portion including a battery receiving portion having an open end;
a motor supported within the motor housing portion;
a trigger located on a first side of the handle portion, wherein the trigger is configured to be actuated to energize the motor;
a battery received by the battery receiving portion through the open end;
a bracket coupled to the handle portion on a second side of the handle portion opposite the first side; and
a tether coupled to the bracket,
wherein the bracket is positioned such that the open end of the battery receiving portion faces upward if the tether arrests a fall of the power tool to inhibit the battery from falling out of the battery receiving portion.

\* \* \* \* \*